June 27, 1944.  D. POLOWE  2,352,405
NAVIGATION INSTRUMENT
Filed Aug. 18, 1942
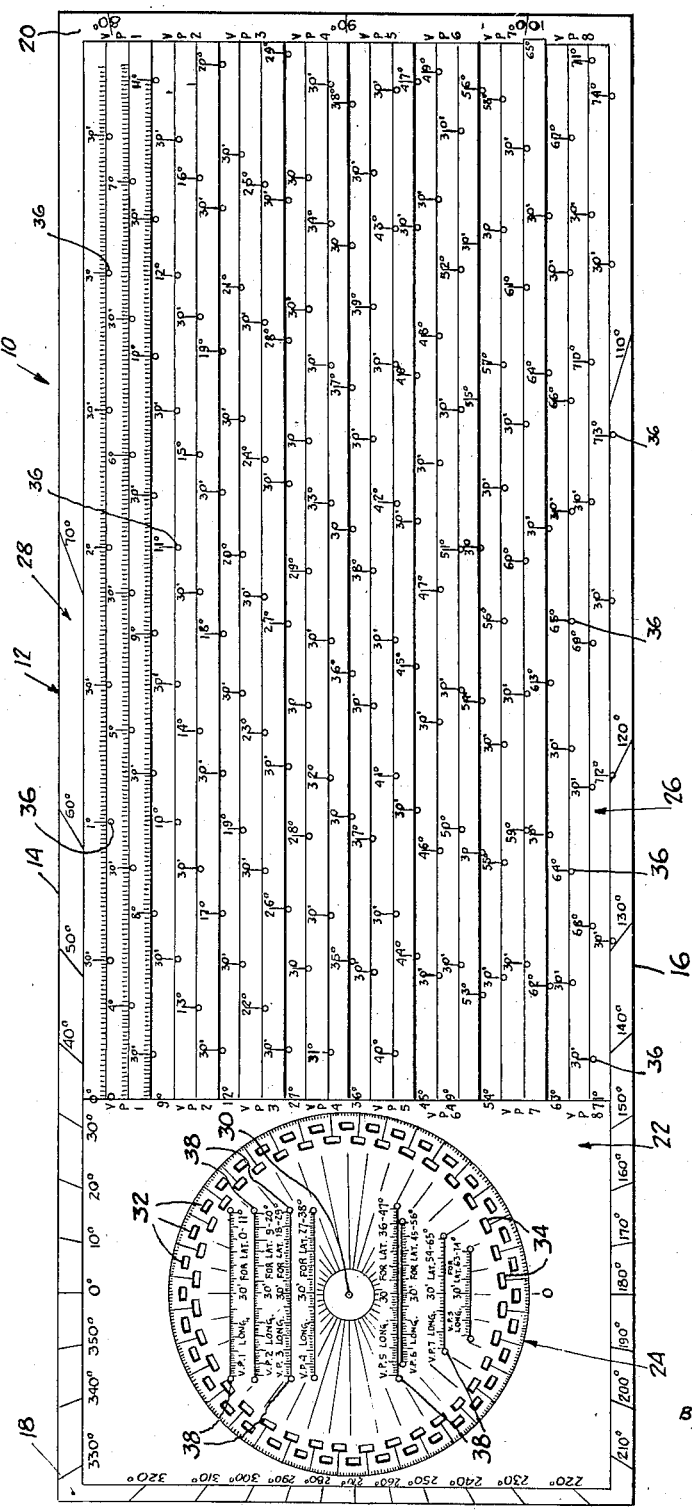
INVENTOR.
DAVID POLOWE
By Edwin Levisohn
ATTORNEY Patented June 27, 1944

2,352,405

UNITED STATES PATENT OFFICE 2,352,405

NAVIGATION INSTRUMENT

David Polowe, Paterson, N. J.

Application August 18, 1942, Serial No. 455,257

3 Claims. (Cl. 33—104)

This invention relates to a plotting instrument for use in navigation by mariners and aviators.

The purpose of the present invention is to provide a navigation or plotting instrument which, in the form of a single tool, makes unnecessary the use of charts, parallel rulers, protractors, dividers, etc. More specifically, this instrument which is in the form of a single convenient tool may be used in all situations which have heretofore necessitated the use of additional instruments such as charts, parallel rulers, protractors and dividers, and since the use of charts are unnecessary, it will be understood that ordinary sheets of paper can be utilized for the plotting thereon of courses and distances. These and other advantages of the present invention will be hereinafter pointed out in further detail, and by way of illustration of the uses of this instrument, several problems taken from my book entitled "Navigation for Mariners and Aviators" will be referred to.

The invention will now be more particularly described with reference to the accompanying drawing in which the figure is a plan view of the instrument constituting a presently preferred embodiment of the invention.

As shown in the drawing, the navigation instrument 10, embodying the present invention, comprises in its preferred form a transparent sheet 12 of rectangular form, the opposite side edges 14 and 16 being parallel, and the opposite end edges 18 and 20 being parallel to each other and at right angles to side edges 14 and 16. Said sheet 12 can be made of transparent or translucent Celluloid or of any other suitable transparent or translucent material. While the size of the instrument may vary, as will be readily understood, it is preferably about 16 inches in length and about 4 inches in width, and its thickness, which it will be understood may also vary, is preferably about that of the Celluloid triangles and similar instruments used in drafting.

Said transparent sheet 12 comprises a section 22 having delineated thereon a compass rose 24 and a laterally adjacent section 26 having delineated thereon a plurality of latitude scales in linear form. It will be noted that section 26 is provided with all of the latitude scales from VP-1 to VP-8, inclusive, which are the latitude scales found on current aircraft plotting sheets. More particularly, as is well known to navigators, the notations VP-1, VP-2, VP-3, VP-4, VP-5, VP-6, VP-7 and VP-8 are the Government identification notations of eight different navigation charts, respectively, published at the Hydrographic Office, Washington, D. C., October 1931, under the authority of the Secretary of the Navy. Each of these eight separate charts, known as "Aircraft plotting sheets" has a latitude scale of eleven degrees, the eight charts together covering seventy-four degrees of latitude beginning with 0° at the equator. Chart VP-1 carries the latitude scale 0° to 11°, and the eleven degree scale of each succeeding chart begins with two degrees less than the last degree on the immediately preceding chart. Thus, chart VP-2 begins with 9° and extends to 20°, chart VP-3 begins with 18° and extends to 29°, etc. Also, each of these charts carries a longitudinal scale corresponding to the companion latitude scale, the longitude scales on the tight charts being of different lengths, corresponding to the companion eleven-degree latitude scales, respectively, it being noted that the latitude scales on the different charts are not uniform but differ from each other in accordance with the earth's curvature. In the instrument of the present invention, all of the latitude scales corresponding to the "VP" charts are delineated in succession on section 26 and the longitude scales are fitted within the circle of the compass rose on section 22, being delineated thereon as indicated, and it will be noted that there are 8 longitude scales corresponding to the latitude, VP-1 to VP-8, scales, respectively.

As shown, the peripheral marginal edge portion 28 carries a scale corresponding to the circular degrees of the compass rose. The transparent sheet 12 is provided with openings through which marks can be made on a sheet of paper or other surface over which the instrument is placed in using the same. More particularly, an opening 30 is provided at the center of the compass rose and sets of peripherally spaced openings are provided adjacent to and inside of the reverse bearings of the compass rose. One set of openings, several of which are indicated at 32, are arranged in peripherally spaced relation in one circle, and the other set of openings, several of which are indicated at 34, are arranged in a circle inwardly of openings 32. It will be understood that the circles of these two sets of openings are concentric with each other and with the center of the compass rose. Further, it will be noted that the openings 32 and 34 are in staggered relation and are of such length that each opening has a circumferential or arcuate length of 5°, the openings 32 being, as here shown, at the 10° indications and the openings 34 being at the 5° indications. These openings 32 and 34 permit a mark to be made on the plotting sheet at any point along the bearing indications of the compass rose, such point together with a point marked through the opening 30 at the center of the compass rose determining a straight line corresponding to the bearing indications. Small holes, sufficiently large to permit the passage of a pencil point through, are provided in section 26 on the latitude scales. A few of these holes, several of which are indicated at 36 on the latitude scales, are preferably provided at each 30' and at each degree indication on each of the VP-1 to VP-8 scales. Similar openings 38 are provided at the ends of the longitude scales.

A few of the problems taken from my above mentioned book "Navigation for Mariners and Aviators," published 1942 by the Cornell Maritime Press, 350 West 23rd Street, New York, N. Y., will serve to illustrate the uses of this invention. In respect to the use of the plotter to solve the two main dead reckoning problems of mariners:

Problem I

Given a point of departure in L 30° 25' N. and longitude 81° 10' west it is desired to reach a point of destination in latitude 32° 18' north and longitude 78° 57' west. Find the course and distance.

*Procedure.*—On any sheet of paper rule off a line with the top or bottom of the plotter (instrument 10). Since the course is in an easterly direction, call the west point of the line the point of departure. Then, working eastward along that line and using the longitude value corresponding to the latitude being traversed, measure off 2° 13' which is the difference in longitude between the two points. Place a dot at the easterly point thus found and erect a perpendicular to it equal to the difference in latitude between the two places, 1° 53', using the latitude scale between these two places. In fact, two sides of the right-angled dead reckoning triangle are thus constructed and the hypotenuse represents the course and distance. Draw the hypotenuse with the edge of the plotter.

Now place the center of the compass rose over the point of departure, holding the plotter so that its lower edge is parallel with the east-west line originally drawn. The hypotenuse line can be seen to intersect the compass rose at 45° which is the course.

Now place the latitude value of the point of departure on the scale over the point of departure and as each one-minute division of the latitude scale is the equivalent of one nautical mile, the distance, 160.6 miles (161 miles for all practical purposes), may be read right off the scale by holding the latitude scale right over the hypotenuse line. Sometimes, as in this instance, the scale runs over to the next line, when one marks the end point with a pencil and the remaining distance is read on the next scale. When heading poleward (increasing latitudes), this is the next scale below on the plotter; when heading toward the equator, this is the next scale above on the plotter (decreasing latitudes).

Problem II

The second main dead reckoning triangle involves finding the point of destination when the point of departure, the course, and the distance traversed are known. Thus in the above problem if we have given the point of departure in L 30° 25' N., Lo 81° 10' W., a course of 45° is pursued for a distance of 161 miles, find the point of destination by means of the plotter (instrument 10).

*Procedure.*—Rule off the base line as in the problem above. Place the center of the compass rose over the west point of the line which is the point of departure. Place a pencil dot in the slot at 45° or at the outer margin of the plotter at the 45° mark. Run a line between the point of departure through the other points long enough to cover the estimated run of 161 miles. Then place the latitude value, found on the scale of the plotter over the point of departure parallel to the line of the course and read off the distance and mark the spot at the end of the 161-mile run.

Now drop a perpendicular to the base line from the point above described. Measure the difference of latitude, and hence the latitude arrived at by placing the latitude of the point of departure on the base line, when the latitude of the point arrived at may be read right off the scale. The longitude arrived at is found by stepping off along the bottom the longitude scale corresponding to the latitude being traversed.

It will be understood, of course, that the plotter of the present invention can be used to solve various other navigation problems which, however, need not be further described herein.

From the above description of the instrument embodying the present invention the advantages thereof will be understood by those concerned with navigation. More particularly, it will be understood that this instrument may be used in all situations where the aircraft plotter developed by the Hydrographic Office of the Navy Department, is used, and in addition any paper of suitable size, even an ordinary letter size sheet of paper (8½" x 11") may be used and a chart for the waters being traversed quickly constructed upon it with the aid of this instrument. Thus, the inconvenience which accompanies the use of large, unhandy plotting sheets of the various sizes (VP-1 to VP-8, inclusive) is obviated. This should introduce a large saving in the costs of printing and of paper in the publication of the said current aircraft plotting sheets. Navigators and students of navigation will find this very useful in cramped quarters and for desk work.

The face of any chart, or its reverse side may be used for constructing a Mercator chart to cover the waters and air being traversed, especially when the chart so used is of a different scale than that of the Mercator scale on my plotter. When the ship's fix is thus found it can be readily transferred to the chart in use, or any other chart.

In summary, this plotter is a simple instrument, the use of which can be quickly learned and which is highly advantageous in that it increases accuracy; saves time because problems are quickly and accurately solved thereby; saves space because small sheets of paper may be substituted for the usual inconvenient plotting sheets; saves money and material by replacing the cost of the paper and the printing of the plotting sheets, the use of parallel rulers, dividers, etc.; and makes an excellent addition to lifeboat equipment since charts of all latitudes to 74° north and south may be constructed with it.

While I have shown and described the preferred embodiment of my invention, it will be understood that the latter may be embodied otherwise than as herein specifically disclosed. Accordingly, I do not wish to be limited to the invention as herein specifically illustrated or described, or to the use thereof specifically referred to, except as may be required by the scope of the appended claims.

Having thus described my invention, what I claim and desire to secure by Letters Patent is:

1. A navigation plotting instrument comprising a transparent sheet provided with a compass rose, said sheet having a section provided with a plurality of linear latitude scales extending longitudinally of said section and disposed in a plurality of parallel rows of rectilinear lines, each of said latitude scales consisting of eleven latitude degrees and arranged in succession beginning with the first latitude scale of 0° to 11°, said scales differing from each other in accordance with the earth's curvature, and a section integral with said first mentioned section provided with a plurality of linear longitude scales of different lengths, respectively, one for each of said latitude scales and corresponding to a companion latitude scale, said transparent sheet having openings therethrough at longitudinally spaced points along each of said rectilinear scale lines, respectively, through which marks can be made directly on a surface underlying said transparent sheet and visible therethrough.

2. A navigation plotting instrument comprising a transparent sheet provided with a compass rose, said sheet having a section provided with a plurality of linear latitude scales extending longitudinally of said section and disposed in a plurality of parallel rows of rectilinear lines, each of said latitude scales consisting of eleven latitude degrees and arranged in succession beginning with the first latitude scale of 0° to 11°, said scales differing from each other in accordance with the earth's curvature, and a section integral with said first mentioned section provided with a plurality of linear longitude scales of different lengths, respectively, one for each of said latitude scales and corresponding to a companion latitude scale, said last mentioned section carrying said compass rose thereon and said longitude scales being disposed within said compass rose, said transparent sheet having openings therethrough at longitudinally spaced points along each of said rectilinear scale lines, respectively, through which marks can be made directly on a surface underlying said transparent sheet and visible therethrough, said transparent sheet also having openings therethrough at points spaced longitudinally along each of said longitude scales and at degree indications of said compass rose.

3. A navigation plotting instrument comprising a transparent sheet provided with a compass rose, said sheet having a section provided with a plurality of linear latitude scales extending longitudinally of said section and disposed in a plurality of parallel rows of rectilinear lines, each of said latitude scales consisting of eleven latitude degrees and arranged in succession beginning with the first latitude scale of 0° to 11°, said scales differing from each other in accordance with the earth's curvature, and a section integral with said first mentioned section provided with a plurality of linear longitude scales of different lengths, respectively, one for each of said latitude scales and corresponding to a companion latitude scale, said transparent sheet having openings therethrough at longitudinally spaced points along each of said rectilinear scale lines, respectively, through which marks can be made directly on a surface underlying said transparent sheet and visible therethrough, said transparent sheet also having openings therethrough at points spaced longitudinally along each of said longitude scales.

DAVID POLOWE.